Sept. 15, 1964 T. J. MOSS 3,148,562
ALIGNMENT TOOL FOR DRILL OR TAPPING BITS
Filed Aug. 30, 1962

INVENTOR.
Thomas J. Moss
BY
Hovey, Schmidt, Johnson & Hovey
ATTORNEYS.

United States Patent Office 3,148,562
Patented Sept. 15, 1964

3,148,562
ALIGNMENT TOOL FOR DRILL OR
TAPPING BITS
Thomas J. Moss, 2820 N. 76th St., Bethel, Kans.
Filed Aug. 30, 1962, Ser. No. 220,385
2 Claims. (Cl. 77—62)

This invention relates to a tool assembly for facilitating drilling or tapping of passages in a workpiece so that the axis of the drilled or tapped aperture is exactly parallel with the axis of a passage in spaced relationship on the workpiece with respect to the bore on which the drilling or tapping operation is being carried out. Specifically, the tool assembly is adapted to permit proper positioning of a bit guide over an aperture requiring redrilling or retapping, and to maintain the bit guide in accurate disposition with respect to the passage being worked on, so that the axis of the bit is maintained in true parallel relationship to another drilled or tapped opening in spaced relationship from the drill or tapping bit.

Many types of mechanical devices employ stud bolts or similar fasteners for securing one part to another, or to retain a fluid in a chamber therefor, and with the fastener being frequently removed for alteration of the parts, or replenishment of fluid in the chamber therefor. Because of the frequency of removal and replacement of the fasteners in the tapped apertures therefor, the threads of the metal piece receiving the fastener oftentimes are stripped, requiring retapping or reboring of the passage for insertion of a new bolt therein. One answer to this problem has been the placement of a device in the bolt receiving aperture, obviating the necessity of tapping the side walls of the bore because of the inherent construction of the thread defining device placed in the bolt aperture. For example, one suitable device of this character is manufactured and sold under the name of "Heli-Coil" and involves a coil spring member which is inserted in the bolt hole in a position to engage the threads of a bolt threaded into the same. Thus, if it is necessary to replace the Heli-Coil assembly because of extended use thereof, or damage to the coil device upon improper threading of a bolt into the unit, it is not necessary to retap the metal piece receiving the bolt, but the mechanism can be readily repaired by inserting a new Heli-Coil assembly therein.

In order to assure proper disposition of the Heli-Coil unit in the bolt aperture, or to provide accurate retapping of a bolt hole in a metal piece, it is desirable that mechanism be available to assure that the drill bit used in drilling out the bolt hole or retapping the same, be in true axial relationship to the bore being redrilled or retapped. Generally, more than one bolt receiving passage will be provided in the metal piece, in relatively close spaced relationship, and it is very rare that more than one of a number of adjacent bolt receiving passages are in a stripped condition requiring reboring or retapping thereof. Thus, a threaded bolt hole or one containing a usable Heli-Coil device therein, is available adjacent the bore requiring retapping or redrilling, so that the bolt hole in good condition can be used as a guide for maintaining the drilling or tapping bit in proper alignment with the axis of the passage undergoing redrilling or retapping, throughout the drilling operation.

One specific example of metal parts wherein it is necessary in certain instances to redrill or retap bolt holes therein, are the components of an aircraft engine, and under these circumstances, it is desirable that the alignment tool for the drill or tapping bit be highly portable so that the same can be used directly on the engine without the necessity of dismantling the components of the engine or requiring removal of the same from the aircraft frame or wing supporting structure therefor.

It is therefore the primary object of the present invention to provide an alignment tool for drill or tapping bits meeting the requirements set forth above, fully capable of solving the problem of providing a guide for a drill or tapping bit so that the axis of the bit is maintained in coaxial relationship with the passage being redrilled or retapped, and which is usable for various sizes of drill or tapping bits.

Another particularly important object of the invention is to provide an alignment tool for drill or tapping bits wherein the axis of the bit is maintained in true coaxial relationship with the axis of the bolt hole being redrilled or retapped, by virtue of maintenance of the axis of the bit in parallel relationship to the axis of a threaded passage in the workpiece, in spaced relationship from the drill or tapping bit.

Also an important object of the invention is to provide a tool assembly for maintaining the axis of a bit during use thereof on a planar workpiece, in generally parallel relationship to the axis of a nearby passage in the workpiece, wherein is included novel means for initially assuring that a drill or tapping bit guide for the bits is in true coaxial relationship to the passage requiring redrilling or retapping, and then capable of maintaining the guide in such accurate aligned disposition, until the drilling operation has been fully completed.

A still further important aim of the invention is to provide an alignment tool as described above which is especially useful for redrilling or retapping of bolt receiving passages in aircraft engines or the like wherein the necessity of employing cumbersome, expensive and time consuming mechanisms and devices is obviated, and the redrilling or retapping of the bolt receiving bore may be carried out with various sizes of taps or drills, and in a minimum of time.

Also an important aim of the invention is to provide an alignment tool adapted to perform the functions referred to previously, which is extremely simple in construction, made up of components that are resistant to misalignment because of abuse of the alignment tool, formed of easily replaceable parts if necessary, and designed to accommodate presently available drilling and tapping bit guides.

Other objects and advantages of the present tool assembly will become obvious or be described in greater detail as the following specification progresses.

Figure 2:
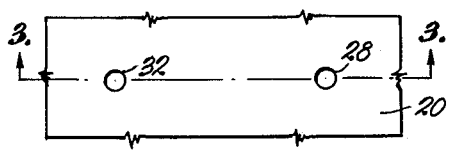
FIG. 2 is a fragmentary, plan view of a metal piece having a pair of spaced, internally threaded, bolt receiving passages therein.
Figure 6:
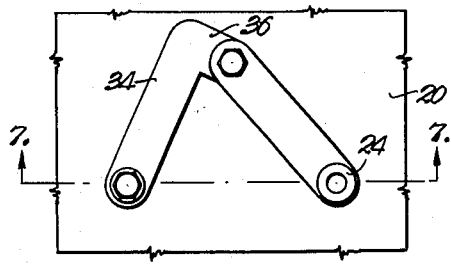
FIG. 6 is a plan view similar to FIG. 4 but illustrating the alignment tool with a drill or tapping guide in the extremity thereof overlying the stripped passage in the metal piece.
Figure 3:
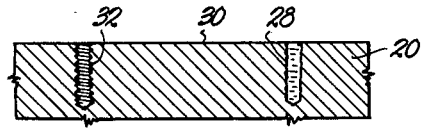
FIG. 3 is a vertical cross-sectional view on the line 3—3 of FIG. 2 and illustrating that the tapped left-hand passage is in good condition while the threads of the right-hand passage have been stripped in such a manner as to prevent proper threading of a bolt thereinto.
Figure 7:
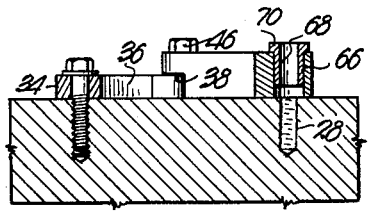
FIG. 7 is a vertical cross-sectional view taken on the line 7—7 of FIG. 6.

The alignment tool assembly broadly designated 10 in the drawings includes a first arm member 12, a second arm member 14 pivotally joined to member 12 by combination pivot and locking means 16, securing means 18 on arm member 12 for releasably securing the latter to the metal piece 20, an alignment device 22 adapted to be releasably mounted on the arm member 14, and a drill or tapping bit guide 24 which may be placed on arm member 14 in lieu of the alignment device 22.

The alignment tool assembly 10 is especially adapted for maintaining a drill bit, or a tapping bit such as 26, in proper disposition during redrilling or retapping of a passage such as the stripped bore 28 formed in metal piece 20 and opening outwardly through the planar face 30 thereof. As previously mentioned, many workpieces have a number of threaded passages therein in relatively close spaced relationship, and thus the metal piece 20 is provided with a threaded bolt receiving bore 32 therein positioned with the axis thereof in parallel relationship to the axis of stripped passage 28. The tool assembly 10 is especially adapted to provide a guide for the bit 26 during retapping or redrilling of passage 28.

Figure 4:
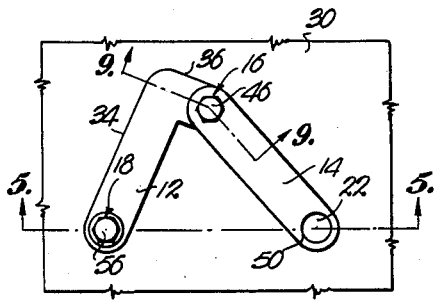
FIG. 4 is a plan view of the metal piece illustrated in FIG. 2, and showing the way in which the alignment tool is positioned over the planar face of the metal component and with one end of the alignment tool positioned over one of the passages and the opposite end of the tool having an alignment member thereon located above the stripped passage.

The arm member 12 is of generally L-shaped configuration and includes an elongated, generally rectilinear leg 34 integral with a short foot or leg 36 extending laterally from the longitudinal axis of leg 34. The normally lowermost surfaces of legs 34 and 36 of arm member 12 are of relatively flat configuration and in coplanar relationship so that such surfaces may complementally engage the planar face 30 of workpiece 20 as shown in FIG. 4.

Figure 9:
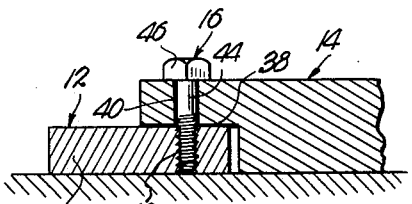
FIG. 9 is an enlarged, vertical cross-sectional view taken on the irregular line 9—9 of FIG. 4.
Figure 1:
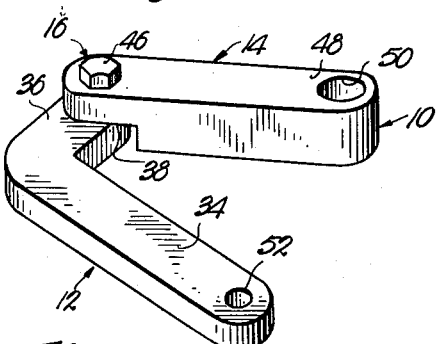
FIGURE 1 is a perspective view of the major components of a tool assembly embodying the preferred concepts of the present invention, but with the aperture alignment member and a drill or tapping bit guide removed from the assembly to more clearly show the construction of the unit.

The elongated arm member 14 has a cutout section 38 in one end thereof of sufficient depth to accommodate the leg 36 of arm member 12 as is clear from FIGS. 1 and 9. Thus, the extremity of arm member 14 having notched section 38 therein, overlies the leg 36 of arm member 12 and is provided with a transversely extending passage 40 therethrough aligned with a threaded passage 42 through leg 36 of arm member 12. The combination pivot and locking means 16 comprises a bolt having a threaded shank 44 and an enlarged head 46. As is clear from FIG. 9, the shank 44 extends through and is freely rotatable in the passage 40, with the head 46 of the bolt overlying the upper surface of arm member 14. The threaded section of shank 44 is complementally received in passage 42 to permit swinging movement of arm members 12 and 14 about the axis of shank 44 until head 46 is moved into tight frictional engagement with the upper surface of arm member 14.

It is also to be noted that the normally lowermost surface of arm member 14 is relatively flat and coplanar with the lower surface of arm member 12 so that both of the arm members may complementally engage the planar surface 30 of metal piece 20.

The end 48 of arm member 14 is provided with an aperture 50 therein located with the axis thereof in generally parallel relationship to the longitudinal axis of bolt means 18. The aperture 50 receives either the alignment device 22 or a bit guide 24 as will be explained.

The end of leg 34 of arm member 12 remote from leg 36 has a passage 52 therethrough positioned with the axis of the same in parallelism with the axes of bolt means 16 and aperture 50, and passage 52 is adapted to receive securing means 18 in parallelism with the axes of passages 40 and 42 and the aperture 50. The securing means 18 comprises a bolt having a threaded shank 54 and an enlarged head 56 positioned over the upper surface of leg 34. The shank 54 extends through passage 52 in arm member 12 and is adapted to be complementally threaded into bore 32 in workpiece 20. A washer 58 may be positioned between the upper face of leg 34 and head 56 of bolt 18 if desired.

Figure 5:
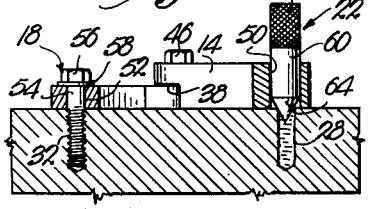
FIG. 5 is a vertical cross-sectional view taken substantially on the line 5—5 of FIG. 4.

The alignment device 22 preferably comprises an elongated metal rod 60 of a diameter to be complementally received in aperture 50 and of substantially greater length than the effective thickness of the arm member 14. The upper section of rod 60 is knurled as at 62 to facilitate handling of the rod, while the lowermost segment 64 of the rod is of generally conical configuration as shown in FIG. 4, with the axis of the cone lying on the longitudinal axis of rod 60. The effective diameter of rod 60 is greater than the diameter of passage 28 so that the side wall of segment 64 will engage the aperture in face 30 of metal piece 20 defining the entrance to passage 28, thereby causing the lower extremity of rod 60 to be partially telescoped in passage 28 as best shown in FIG. 5. In this manner, the axis of aperture 50 may be aligned with the axis of passage 28 when the conical segment 64 of rod 60 is complementally received in the upper end of passage 28.

During use of alignment tool assembly 10, the alignment device 22 may be replaced by the bit guide 24 that is conventionally available on the open market and comprises a tubular segment 66 adapted to be complementally received in aperture 50 and provided with a central bore 68 therethrough adapted to serve as a guide for the tapping bit 26 or the like. The annular flange 70 integral with the upper margin of segment 66 is of a width to overlie the upper surface of arm member 14 in surrounding relationship to aperture 50, to thereby maintain bit guide 24 in a fixed position on arm member 14.

The operation of alignment tool assembly 10 to permit redrilling or retapping of passage 28 so that the axis thereof remains in true parallelism with the axis of a passage such as 32 in metal piece 20, is a simple and fast procedure requiring little skill on the part of the workman. Initially, the bolt 18 is not threaded into passage 42 to a sufficient extent to prevent relative movement between arm members 12 and 14. The bolt 16 however, should not be sufficiently loose to permit substantial wobbling movement of one of the arm members relative to the other arm member.

The workman lays the tool assembly 10 on the face 30 of metal piece 20 in a position with the passage 52 in leg 34 of arm member 12 in substantial alignment with the threaded passage 32. The bolt means 18 is then passed through passage 52 in leg 34 and threaded into the passage 32 to an extent that swinging movement of arm member 12 is still possible, but without substantial rotation of arm member 12 about the longitudinal axis of leg 34. The arm member 12 is then grasped and moved toward the passage 28 until the aperture 50 is in direct overlying relationship to the aperture defining the opening of passage 28, whereupon the alignment device 22 is then positioned in aperture 50 with the conical segment 64 thereof facing downwardly as shown in FIG. 5. The operator grasps the knurled section 62 of rod 60 and shifts arm member 14 until conical segment 64 is complementally received in passage 28 and no discernible motion can be imparted to member 14 while a force is exerted not only downwardly but also in different directions on the rod 60 lateral of the longitudinal axis of the same.

When the workman is satisfied that the axis of aperture 50 is in direct alignment with the axis of passage 28, he uses a conventional wrench to tighten the bolt means 16 and 18 while maintaining downward pressure on rod 60. The head 56 of bolt means 18 is moved downwardly into sufficient frictional engagement with the washer 58, in turn engaging the upper surface of leg 36, to preclude rotation of arm member 12 about the axis of bolt means 18. Likewise, the head 46 of bolt means 16 is forced into sufficient frictional engagement with the upper face of arm member 14 to prevent subsequent relative rotation between arm members 12 and 14.

Figure 8:
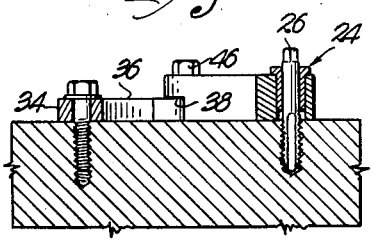
FIG. 8 is a vertical cross-sectional view similar to FIG. 7 and taken on the same line, but illustrating the way in which the guide serves to maintain a tapping bit in coaxial relationship with the initially stripped passage during retapping thereof.

Upon final securing of the bolt means 16 and 18, the workman removes the alignment device from aperture 50 and replaces the same with the bit guide 24 illustrated in FIG. 8 and previously described in detail.

The workman then attaches a suitable drill bit or tapping bit 26 to a power device such as a portable drill and inserts the bit in the bore 68 of bit guide 24. Since the outer surface of the bit 26 complementally engages the surface of segment 66 defining bore 68, the axis of bit 26 is maintained in coaxial relationship with the axis of passage 28 and also in parallelism with the axis of passage 32.

It is to be appreciated that various sizes of bit guides may be provided in aperture 50 depending upon the diameter of passage 28 and without modification of the tool assembly 10 being required in any way.

Having thus described the invention what is claimed as new and desired to be secured by Letters Patent is:

1. A tool assembly for maintaining the axis of a bit during use thereof on a planar workpiece, in generally parallel relationship to the axis of a passage in said workpiece and spaced from said bit, said tool assembly comprising:
    a first elongated member;
    means on said first member adjacent one extremity thereof adapted to be removably positioned in said passage for securing said first member to the workpiece in any desired position radial to the passage;
    a second elongated member;
    means pivotally connecting one end of the second member to the extremity of said first member opposed to said one extremity thereof for permitting relative swing movement of the members only about an axis generally parallel to the axis of said passage when the first member is connected to the workpiece by said securing means, said connecting means comprising a bolt having a threaded shank and an enlarged head, said shank extending through one of the members and threaded into the other member whereby the head of the bolt is located adjacent said one member, said other member being freely swingable relative to the one member about the axis of the bolt until the head thereof is moved into frictional engagement with said one member; and
    guide means on the end of said second member opposed to said one end thereof for complementally receiving said bit to maintain the axis thereof parallel to the axis of the passage during rotation of the bit.

2. A tool assembly for maintaining the axis of a bit during use thereof on a planar workpiece, in generally parallel relationship to the axis of a passage in said workpiece and spaced from said bit, said tool assembly comprising:
    a first elongated member;
    means on said first member adjacent one extremity thereof adapted to be removably positioned in said passage for securing said first member to the workpiece in any desired position radial to the passage, said securing means comprising a bolt having a threaded shank and an enlarged head, said shank being freely rotatable in and extending through said one extremity of the first member and the head of the bolt normally engaging the upper surface of said first member whereby, upon threading of the shank into said passage to an extent to bring the head of the bolt into frictional engagement with the first member, the latter is locked against shifting movement relative to the workpiece;
    a second elongated member;
    means pivotally connecting one end of the second member to the extremity of said first member opposed to said one extremity thereof for permitting relative swinging movement of the members only about an axis generally parallel to the axis of said passage when the first member is connected to the workpiece by said securing means; and
    guide means on the end of said second member opposed to said one end thereof for complementally receiving said bit to maintain the axis thereof parallel to the axis of the passage during rotation of the bit.

References Cited in the file of this patent
UNITED STATES PATENTS

| 1,191,906 | Miller et al. | July 18, 1916 |
| 2,341,418 | Atkins | Feb. 8, 1944 |

FOREIGN PATENTS

| 170,513 | Switzerland | Oct. 1, 1934 |
| 645,227 | Great Britain | Oct. 25, 1950 |

OTHER REFERENCES

American Machinst (publication), "A Spacing Center Punch and an Ingenious Line Chalker," pages 368, dated Feb. 26, 1931.